United States Patent [19]

Hagan et al.

[11] Patent Number: 4,840,083
[45] Date of Patent: * Jun. 20, 1989

[54] DEVICE FOR DAMPENING ROTARY MOTION

[75] Inventors: Robert A. Hagan, Roscoe; Ernest W. Reinwall, McHenry, both of Ill.

[73] Assignee: Elco Industries, Inc., Rockford, Ill.

[*] Notice: The portion of the term of this patent subsequent to May 30, 2006 has been disclaimed.

[21] Appl. No.: 167,700

[22] Filed: Mar. 14, 1988

[51] Int. Cl.$^4$ ................................. F16F 15/10
[52] U.S. Cl. ........................... 74/574; 74/572; 74/527; 74/531
[58] Field of Search ............ 74/572, 573 R, 574, 74/527, 531; 310/261; 188/83, 130

[56] References Cited

U.S. PATENT DOCUMENTS

| | | | |
|---|---|---|---|
| 2,643,632 | 6/1953 | Sigmon | 74/531 |
| 2,826,093 | 3/1958 | Draper | 74/531 X |
| 2,845,145 | 7/1958 | Lee | 74/531 |
| 2,870,887 | 1/1959 | Cole et al. | 74/531 X |
| 2,922,669 | 1/1960 | Hansen | 74/527 X |
| 3,059,497 | 10/1962 | Eadie | 74/527 |
| 3,130,826 | 4/1964 | Davis et al. | 74/527 X |
| 3,828,893 | 8/1974 | Clark | 74/531 X |
| 3,921,955 | 11/1975 | Haddad | 74/531 X |
| 4,700,587 | 10/1987 | Bianchi et al. | 74/527 |
| 4,744,265 | 5/1988 | Nagano | 74/527 X |

FOREIGN PATENT DOCUMENTS 679840 2/1964 Canada ..................... 74/574

Primary Examiner—Richard E. Moore
Assistant Examiner—Vinh Luong
Attorney, Agent, or Firm—Leydig, Voit & Mayer, Ltd.

[57] ABSTRACT

A shaft is journaled to rotate in a housing and is formed with an enlarged disc which carries an elastomeric ring. As the shaft rotates, the ring is compressed against and is massaged by protrusions extending axially into the housing and coacting with the ring to apply a retarding torque to the shaft. In one embodiment, the protrusions are semispherical buttons which are formed integrally with the end wall of the housing. In another embodiment, the protrusions are spherical balls which are free to spin in semispherical pockets formed in the end wall of the housing.

11 Claims, 2 Drawing Sheets

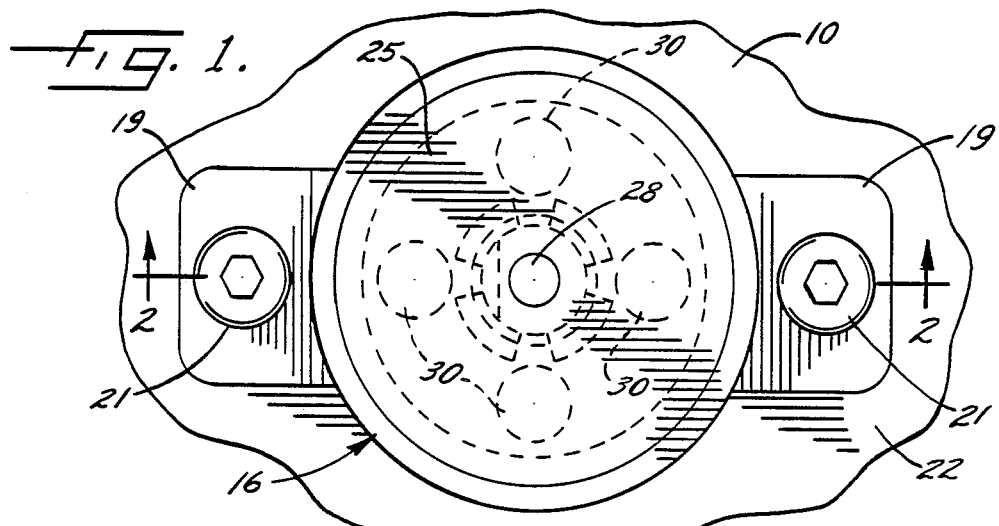
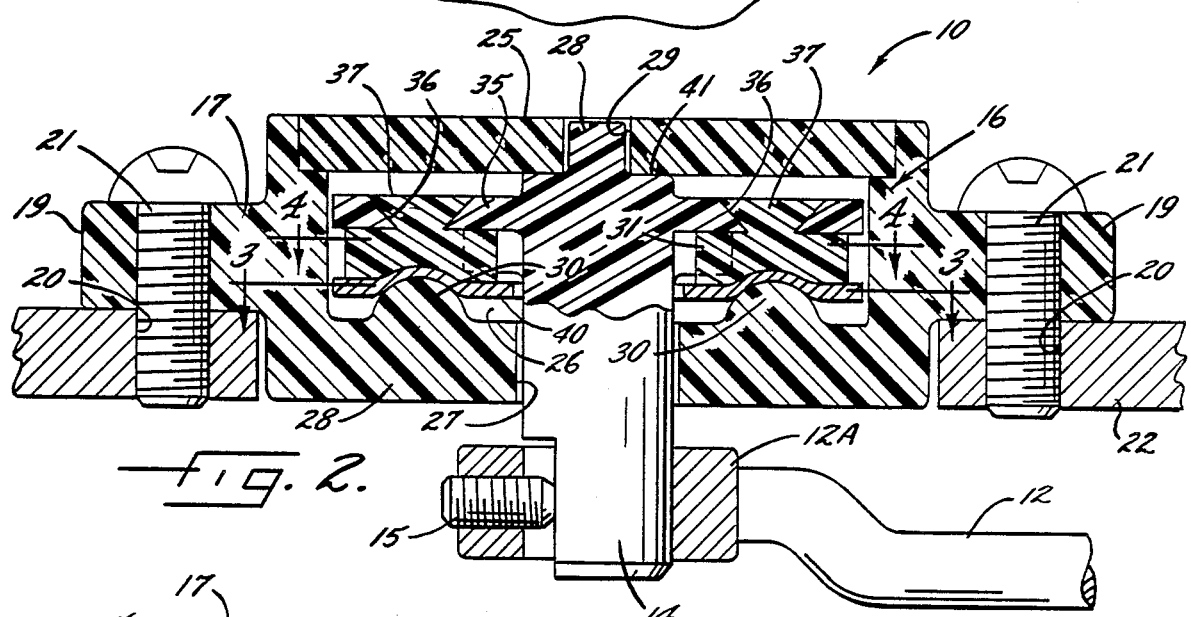
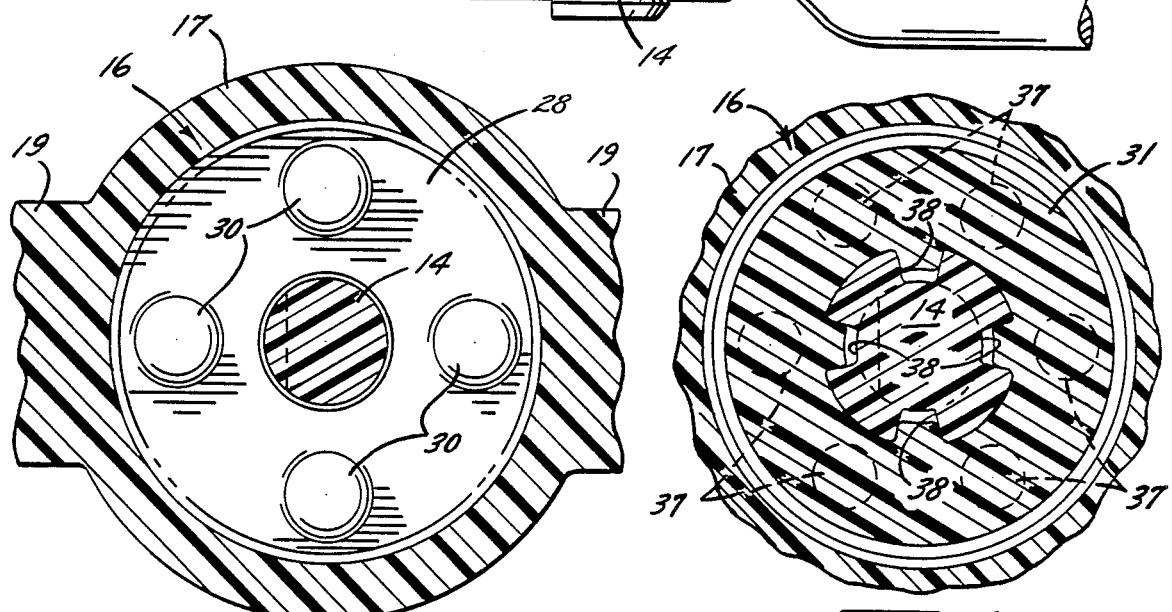

DEVICE FOR DAMPENING ROTARY MOTION

BACKGROUND OF THE INVENTION

This invention relates generally to apparatus for dampening the motion of a first member relative to a second member during rotation of the first member with respect to the second member. More particularly, the invention relates to a motion dampener which is relatively small in size and which retards the rotatable member with torque of relatively small magnitude.

Many miniature motion dampeners of the foregoing type rely on the coaction of a rotary impeller with a viscous material (e.g., a heavy grease) contained in a housing. As the impeller rotates, it shears through the viscous material so as to apply a retarding torque to the impeller. A major disadvantage of motion dampeners of this type is that the viscous material tends to leak from the housing unless rather costly steps are taken to completely seal the housing.

Other relatively small motion dampeners operate "dry" and simply rely on the force of one member against another to apply a retarding torque to the rotatable member. Prior dampeners of this type tend to be somewhat complex and most are incapable of applying a constant retarding torque to the rotatable member throughout the range of movement of the member. Moreover, many of the so-called dry dampeners still require some amount of lubricant for the components.

SUMMARY OF THE INVENTION

The general aim of the present invention is to provide a new and completely dry motion dampener wich is relatively simple and inexpensive to manufacture, which may be of very small size and which is capable of imposing retarding torque of very small magnitude on the rotary member.

A more detailed object is to achieve the foregoing by providing a motion dampener in which angularly spaced protrusions on the fixed member massage and knead an elastomeric ring on the rotatable member in order to apply a retarding torque to the rotatable member.

Still another object of the invention is to provide a motion dampener having relatively inexpensive protrusions which may be formed integrally with the fixed member and which massage the elastomeric ring by way of a thin and flexible anti-friction washer that serves to reduce friction between the protrusions and the ring.

The invention also resides in the provision of a motion dampener having protrusions in the form of spherical balls which may spin freely to massage the elastomeric ring and to apply relatively small retarding torque to the ring and the rotatable member.

These and other objects and advantages of the invention will become more apparent from the following detailed description when taken in conjunction with the accompanying drawings.

BRIEF DESCRIPTION OF THE DRAWINGS

FIG. 1 is an end view of one embodiment of a new and improved rotary motion dampener incorporating the unique features of the present invention.

FIG. 2 is an enlarged fragmentary cross-section taken substantially along the line 2—2 of FIG. 1.

FIGS. 3 and 4 are fragmentary cross-sections taken substantially along the lines 3—3 and 4—4, respectively, of FIG. 2.

DETAILED DESCRIPTION OF THE PREFERRED EMBODIMENTS

Figure 5:
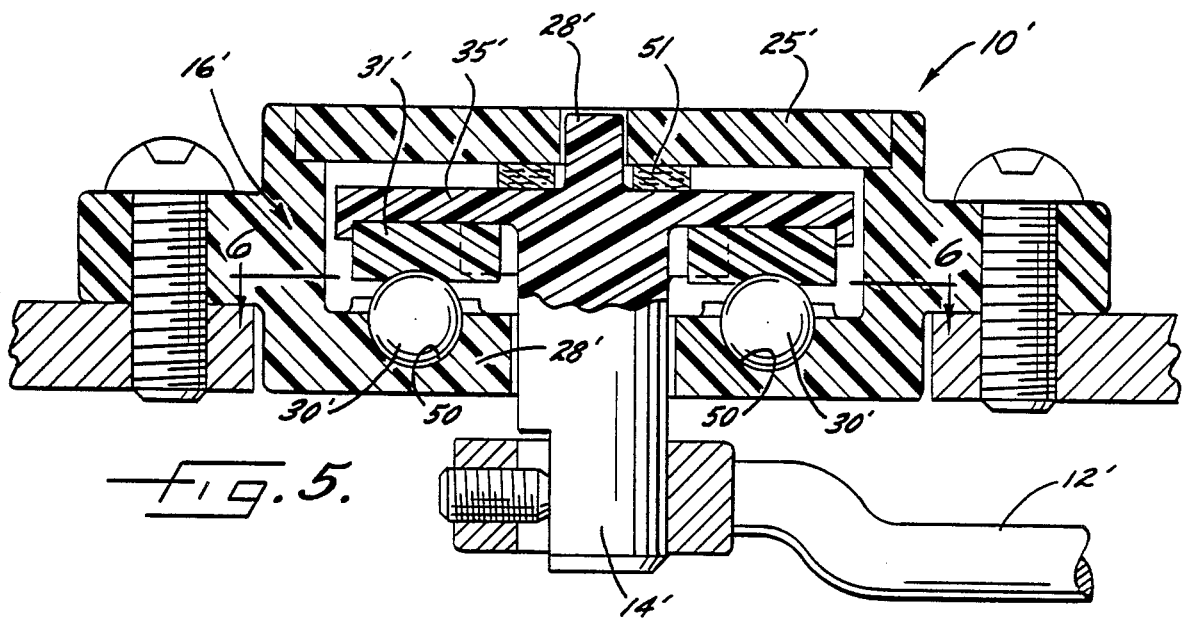
FIG. 5 is a view similar to FIG. 2 but shows another embodiment of a motion dampener constructed in accordance with the invention.

For purposes of illustration, the present invention has been shown in the drawings as embodied in apparatus 10 for dampening the motion of a rotary member 12 which herein has been shown simply as being an arm. The apparatus 10 includes a hard plastic shaft member 14 connected to a hub 12A of the arm by a set screw 15 and supported to rotate by a housing member 16. The present housing 16 has a length of about 0.25" and a diameter of about 0.6".

More particularly, the housing 16 includes a cup-shaped body 17 molded from suitable hard plastic and formed with a pair of diametrically spaced and radially projecting ears 19 having holes 20 for receiving screws 21 for securing the housing to a mounting base 22. The housing 16 further includes a wall or cover 25 also made of plastic and bonded to the body by ultrasonic welding. Together, the body 17 and the cover 25 define a cylindrical chamber 26 within the housing.

A hole 27 is formed through the end wall 28 of the body 17 and receives one end portion of the shaft 14 with a free-running fit. The other end of the shaft is formed with a reduced-diameter extension 28 which is received within a hole 29 in the cover 25 with a free-running fit.

According to the present invention, angularly spaced protrusions 30 project from the end wall 28 of the housing 16 and extend axially into the chamber 26 defined within the housing. The protrusions compress an elastomeric ring 31 on the shaft 14 and, as the shaft rotates, the protrusions massage the ring to apply a retarding force to the shaft.

In the embodiment of the dampener 10 shown in FIGS. 1 to 4, the protrusions 30 advantageously are molded integrally with the end wall 28 of the housing 16 and preferably are substantially semi-spherical in shape. Herein, there are four protrusions 30 spaced angularly from one another around the end wall 28. Each protrusion is formed on a spherical radius of approximately 0.050". The center of each protrusion lies substantially in the same plane as the inside face of the end wall 28.

In the present instance, the elastomeric ring 31 is made of A50 polyurethane. The ring is adapted to be captivated snugly against one face of a hard and rigid disc 35 formed integrally with and projecting radially from the shaft 14 adjacent the extension 28. For this purpose, six angularly spaced holes 36 are formed through the disc and taper toward the ring side of the disc. The ring 31 is molded in-place on the disc 35 and, as an incident thereto, plugs 37 of polyurethane flow into the holes 36 and anchor the ring to the disc. If desired, the shaft 14 may be formed with angularly spaced grooves 38 (FIG. 4) which interlock with the polyurethane to help anchor the ring even more securely.

Importantly, a thin washer 40 (FIG. 2) made of anti-friction material such as "TEFLON" (tetra-fluoroethylene) is interposed between the protrusions 30 and the ring 31. Herein, the washer has a thickness of about 0.010".

As shown in FIG. 2, the end portion 41 of the shaft 14 adjacent the extension 28 engages the inside face of the cover 25. The cover thus acts against the shaft and through the disc 35 to press the ring 31 against the anti-friction washer 40 and to cause the washer to be pressed against the round protrusions 30. Since the washer is very thin, it is resiliently deformed by the protrusions and, as shown in a greatly exaggerated manner in FIG. 2, the protrusions act through the washer to resiliently deform and compress the polyurethane ring 31. By changing the thickness of the end portion 41 of the shaft 14, the degree of compression imparted to the ring may be changed.

When the shaft 14 rotates, the compressed ring 31 acts through the washer 40 and creates a force against the protrusions 30. Such force dampens rotation of the shaft and applies a retarding torque of very small magnitude (e.g., 1.5 inch-ounces) to the shaft. As the ring rotates, it is continuously massaged by the protrusions acting through the washer 40. The coefficient of friction between the polyurethane ring 31 and the TEFLON washer 40 is greater than the coefficient of friction between the washer and the plastic protrusions 30 and thus the washer tends to rotate with the ring. The washer actually acts as a dry lubricant at the face of the ring so as to prevent the application of high retarding torque to the shaft 14.

Figure 6:
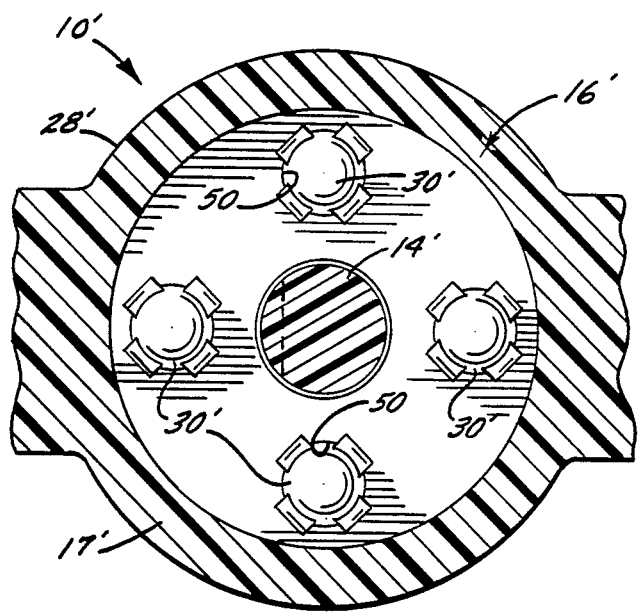
FIG. 6 is a fragmentary cross-section taken substantially along the line 6—6 of FIG. 5.

Another embodiment of a motion dampener 10' is shown in FIGS. 5 and 6 in which parts corresponding to those of the first embodiment are designated by the same but primed reference numerals. In this instance, the protrusions are in the form of four spherical steel balls 30'. The balls are seated in semispherical pockets 50 molded in the inside face of the end wall 28' of the housing 16. Each ball is captivated against bodily movement by the pocket but is free to spin in the pocket. The balls are in direct engagement with the polyurethane ring 31'.

In the embodiment shown in FIGS. 5 and 6, a plastic washer 51 encircles the shaft extension 28' and is sandwiched between the cover 25' and the disc 35' of the shaft 14'. The washer 51 acts between the cover 25' and the disc 35' to press the ring 31' against the balls 30' and thereby cause the balls to compress the ring. By changing the thickness of the washer, the degree of compression imparted to the ring can be increased or decreased so as to increase or decrease the retarding force. The washer 51 serves the same purpose as the shaft portion 41 of the first embodiment insofar as the washer presses the ring toward the protrusions.

As the shaft 14' rotates, the balls 30' massage the compressed ring 31' and cause a retarding force to be applied to the shaft. Because of the balls, the dampener 10' acts with less friction than the dampener 10 but is somewhat more difficult to assemble.

We claim:

1. Apparatus for dampening rotation of a first member relative to a second member, said second member comprising a chamber having an axially facing wall, angularly spaced protrusions projecting from said wall and extending axially into said chamber, said first member comprising a rotatable shaft and further comprising a disc joined rigidly to and projecting radially from said shaft and rotatable in said chamber, an elastomeric ring coupled to and rotatable with said disc, said ring being located on one face of said disc and being disposed between said disc and said protrusions, and means pressing said ring toward said protrusions with sufficient force to cause said ring to be resiliently compressed by said protrusions, the compression of said ring creating a force against said protrusions as said ring rotates relative to said protrusions whereby such force dampens rotation of said first member relative to said second member.

2. Apparatus as defined in claim 1 in which said protrusions are joined rigidly with said wall and remain stationary when said first member is rotated relative to said second member.

3. Apparatus as defined in claim 2 further including a washer made of low friction material and sandwiched between said ring and said protrusions, said washer being sufficiently thin and flexible as to be deformed by said protrusions and to enable said ring to be resiliently compressed by said protrusions in the vicinity of said protrusions.

4. Apparatus as defined in claim 1 in which each of said protrusions includes a generally spherically-shaped surface.

5. Apparatus as defined in claim 1 in which each of said protrusions comprises a spherical ball, and generally semispherical pockets in said wall and captivating said balls against bodily movement while permitting said balls to spin.

6. Apparatus as defined in claim 5 in which said balls and said ring are in direct contact with one another.

7. Apparatus as defined in claim 1 in which said chamber includes a second wall which faces oppositely of said one wall, said means being located between said disc and said second wall and engaging said second wall.

8. Apparatus as defined in claim 7 in which said means comprise an end portion of said shaft.

9. Apparatus as defined in claim 7 in which said means comprise a washer encircling said shaft and sandwiched between said disc and said second wall.

10. Apparatus for dampening rotation of a first member relative to a second member, said second member comprising a chamber having an axially facing wall, angularly spaced protrusions formed integrally with said wall and projecting axially from said wall and into said chamber, each of said protrusions having a generally spherically-shaped surface, said first member comprising a rotatable shaft and further comprising a relatively rigid disc joined rigidly to and projecting radially from said shaft and rotatable in said chamber, an elastomeric ring coupled to and rotatable with said disc, said ring being located on one face of said disc and being disposed between said disc and said protrusions, a washer made of low friction material and sandwiched between said ring and said protrusions, and means for pressing said ring against said washer and for pressing said washer against said protrusions with sufficient force to cause said ring to be resiliently compressed by said protrusions, said washer being sufficiently thin and flexible to enable said protrusions to act through said washer to resiliently compress said ring, the compression of said ring by said protrusions creating a force between said washer and said protrusions as said ring rotates whereby such force dampens rotation of said first member relative to said second member.

11. Apparatus for dampening rotation of a first member relative to a second member, said second member comprising a chamber having an axially facing wall, angularly spaced and generally semispherical pockets formed in said wall, spherical balls supported in said pockets to spin freely while being captivated against bodily movement, said first member comprising a rotatable shaft and further comprising a relatively rigid disc joined rigidly to and projecting radially from said shaft and rotatable in said chamber, an elastomeric ring coupled to and rotatable with said disc, said ring being located on one face of said disc and being disposed between said disc and said balls, and means for pressing said ring against said balls with sufficient force to cause said ring to be resiliently compressed by said balls, the compression of said ring by said balls creating a force between said ring and said balls as said ring rotates whereby such force dampens rotation of said first member relative to said second member.

* * * * *